United States Patent [19]

Enomoto et al.

[11] Patent Number: 5,724,195

[45] Date of Patent: Mar. 3, 1998

[54] FAST SUPER WIDE-ANGLE LENS SYSTEM

[75] Inventors: Takashi Enomoto; Takayuki Ito, both of Tokyo, Japan

[73] Assignee: Asahi Kogaku Kogyo Kabushiki Kaisha, Tokyo, Japan

[21] Appl. No.: 698,929

[22] Filed: Aug. 16, 1996

[30] Foreign Application Priority Data

Aug. 25, 1995 [JP] Japan .................... 7-217733

[51] Int. Cl.$^6$ .................... G02B 13/04; G02B 3/02; G02B 9/12; G02B 9/04
[52] U.S. Cl. .................... 359/752; 359/713; 359/749; 359/784; 359/793
[58] Field of Search .................... 359/753, 752, 359/751, 750, 793, 784, 714, 713, 749

[56] References Cited

U.S. PATENT DOCUMENTS

| | | | |
|---|---|---|---|
| 3,741,630 | 6/1973 | Nakagawa | 359/752 |
| 4,310,222 | 1/1982 | Ikemori | 359/749 |
| 4,431,273 | 2/1984 | Nakamura | 359/749 |
| 5,477,389 | 12/1995 | Ito et al. | 359/752 |
| 5,513,045 | 4/1996 | Ito et al. | 359/750 |
| 5,557,472 | 9/1996 | Ito et al. | 359/751 |

FOREIGN PATENT DOCUMENTS 7-63986  3/1995  Japan .
7-63989  3/1995  Japan .

*Primary Examiner*—David C. Nelms
*Assistant Examiner*—Jordan M. Schwartz
*Attorney, Agent, or Firm*—Greenblum & Bernstein, P.L.C.

[57] ABSTRACT

A super wide-angle fast lens system includes a front lens group having a negative power, a diaphragm and a rear lens group having a positive power. The front lens group consists of a first sub-lens group having a negative power and a second sub-lens group having a negative power which is spaced from the first sub-lens group by a maximum distance. The lens system satisfies the following relationships:

$-0.5 < f/f_F < -0.2$,
$-0.2 < f/f_{1a} < -0.07$,
$3 < d_{ab}/f < 7$, and
$10 < \Sigma d_{F+S}/f < 15$, wherein "f" represents the focal length of the whole lens system, "$f_F$" represents the focal length of the front lens group, "$f_{1a}$" represents the focal length of the first sub-lens group, "$d_{ab}$" represents the distance between the first sub-lens group and the second sub-lens group, and "$\Sigma d_{F+S}$" represents the sum of the thickness of the front lens group and the distance between the front and rear lens groups.

2 Claims, 3 Drawing Sheets

FIG. 1
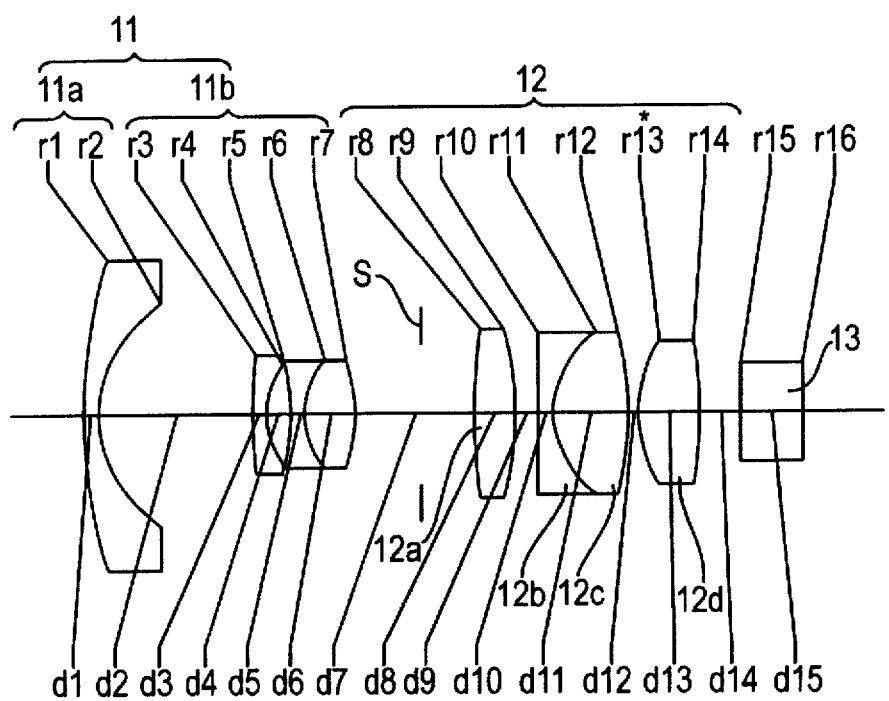
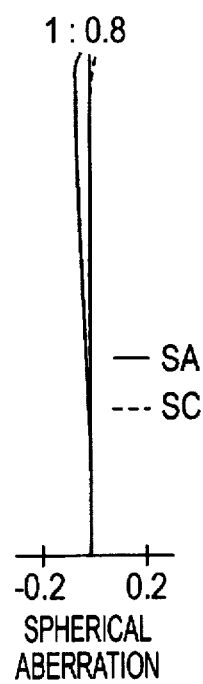
FIG. 2A
1 : 0.8
— SA
--- SC
-0.2  0.2
SPHERICAL
ABERRATION
SINE
CONDITION
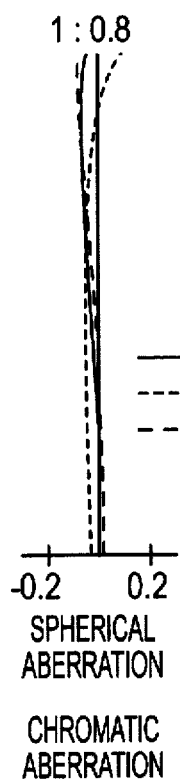
FIG. 2B
1 : 0.8
— d line
---- g line
--- c line
-0.2  0.2
SPHERICAL
ABERRATION
CHROMATIC
ABERRATION
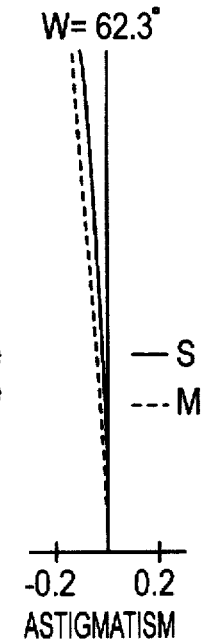
FIG. 2C
W= 62.3°
— S
--- M
-0.2  0.2
ASTIGMATISM
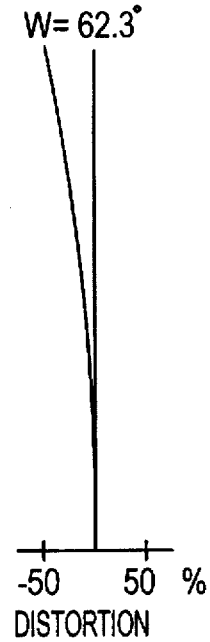
FIG. 2D
W= 62.3°
-50  50 %
DISTORTION FIG. 3
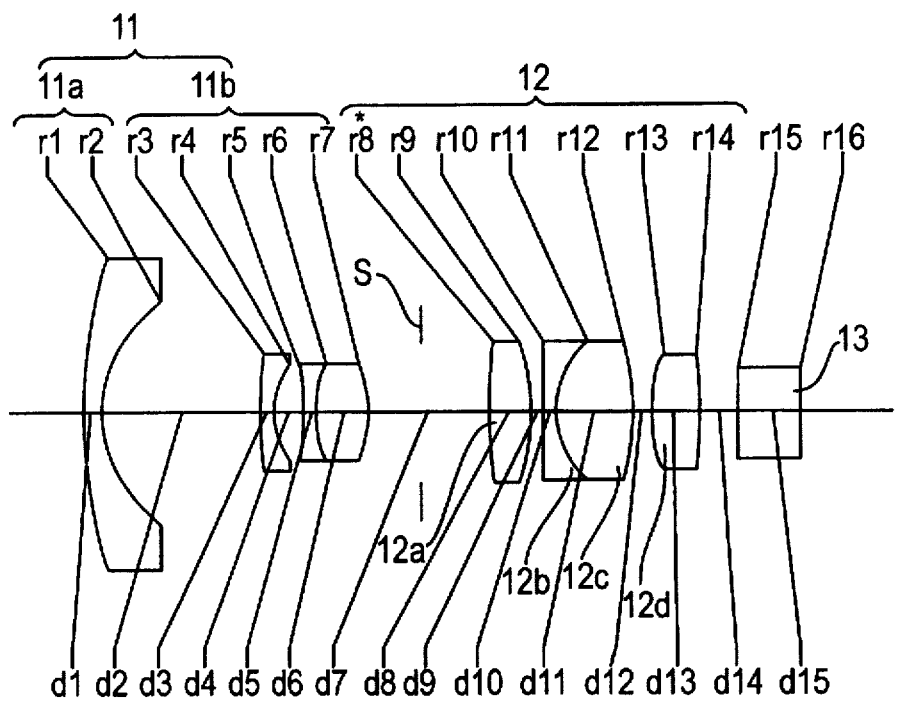
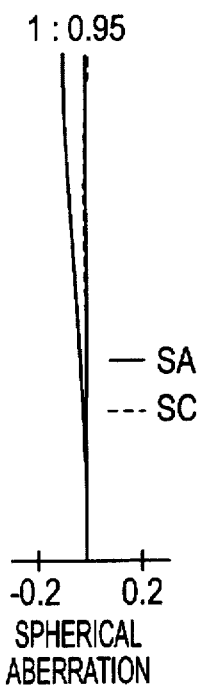
FIG. 4A
1 : 0.95
—— SA
--- SC
SPHERICAL
ABERRATION
SINE
CONDITION
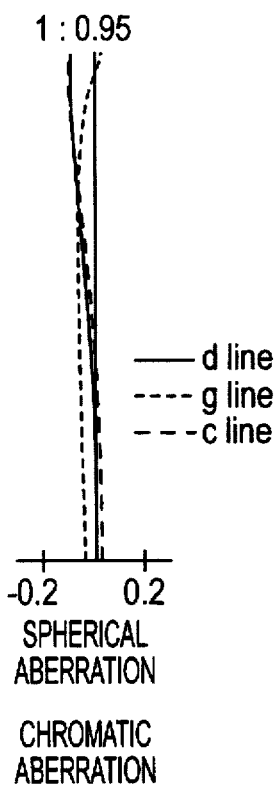
FIG. 4B
1 : 0.95
—— d line
--- g line
--- c line
SPHERICAL
ABERRATION
CHROMATIC
ABERRATION
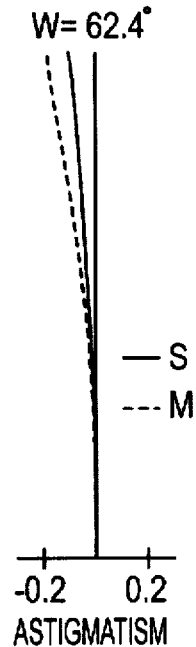
FIG. 4C
W= 62.4°
—— S
--- M
ASTIGMATISM
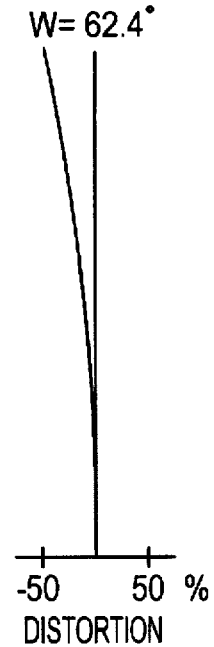
FIG. 4D
W= 62.4°
DISTORTION

1 : 0.95

-0.2    0.2
SPHERICAL
ABERRATION

SINE
CONDITION

— SA
--- SC

1 : 0.95

-0.2    0.2
SPHERICAL
ABERRATION

CHROMATIC
ABERRATION

— d line
··· g line
-- c line

W= 62.6°

-0.2    0.2
ASTIGMATISM

— S
--- M

W= 62.6°

-50    50  %
DISTORTION

FAST SUPER WIDE-ANGLE LENS SYSTEM

BACKGROUND OF THE INVENTION

1. Field of the Invention

The present invention relates to a super wide-angle fast lens system (i.e., a super wide-angle lens having a large aperture) which can be applied to a small TV camera, such as a closed circuit television (CCTV) camera.

2. Description of the Related Art

In recent small TV cameras, such as CCTV camera, in response to the demands of miniaturization and an increase in the resolution of a image pickup devices, the image size has been changed from ½" (inches) to ⅓" (inches). To this end, there is a need for the provision of a fast super wide-angle photographing lens, i.e., a super wide-angle lens having a small F-number and a large aperture. The F-number of conventional photographing lenses of cameras is approximately F1.0 to F1.2.

SUMMARY OF THE INVENTION

It is an object of the present invention to provide a super wide-angle lens having a large aperture which is approximately equal to F0.8 to F0.95, and a half angle of view which is approximately equal to 60°, which can be applied to a small TV camera in which the picture size of the image pickup device is approximately ⅓".

To achieve the object mentioned above, according to the present invention, there is provided a super wide-angle fast lens system including a front lens group having a negative power, a diaphragm and a rear lens group having a positive power, arranged in this order from an object side. The front lens group consists of a first sub-lens group having a negative power and a second sub-lens group having a negative power. The second sub-lens group is spaced from the first sub-lens group by a maximum distance. The lens system satisfies the following relationships (1) through (4):

(1) $-0.5 < f/f_F < -0.2$;

(2) $-0.2 < f/f_{1a} < -0.07$;

(3) $3 < d_{ab}/f < 7$;

(4) $10 < \Sigma d_{F+S}/f < 15$, wherein $f$ represents the focal length of the whole lens system, $f_F$ represents the focal length of the front lens group, $f_{1a}$ represents the focal length of the first sub-lens group of the first lens group, $d_{ab}$ represents the distance between the first sub-lens group and the second sub-lens group of the first lens group, and $\Sigma d_{F+S}$ represents the sum of the thickness of the front lens group and the distance between the front and rear lens groups.

The rear lens group can consist of a positive lens element having a convex surface on the image side, a cemented lens of a negative lens element and a positive lens element which is cemented to the negative lens at a concave surface that faces the image side, and a positive lens element having a convex surface located on the object side. At least one of the lens elements of the rear lens group is provided with a divergent aspherical surface. The lens system preferably satisfies the following relationships (5) and (6):

(5) $-3.0 < \Delta I_{ASP} < -0.5$;

(6) $5.0 < \Sigma d_R/f < 10.0$, wherein $\Delta I_{ASP}$ represents the aberration factor of the aspherical term of the third-order spherical aberration factor of the aspherical surface (assuming that the focal length is identical to 1.0), and $\Sigma d_R$ represents the thickness of the rear lens group.

BRIEF DESCRIPTION OF THE DRAWINGS

The present invention will be described below in detail with reference to the accompanying drawings, in which similar elements are indicated by similar reference numerals, and wherein:

FIG. 1 is a schematic view of a lens arrangement of a super wide-angle fast lens system of a first embodiment;

FIGS. 2A, 2B, 2C and 2D show aberration diagrams of the super wide-angle fast lens system shown in FIG. 1;

FIG. 3 is a schematic view of a lens arrangement of a super wide-angle fast lens system of a second embodiment;

FIGS. 4A, 4B, 4C and 4D show aberration diagrams of the super wide-angle fast lens system shown in FIG. 3;

DESCRIPTION OF THE PREFERRED EMBODIMENTS

Figure 5:
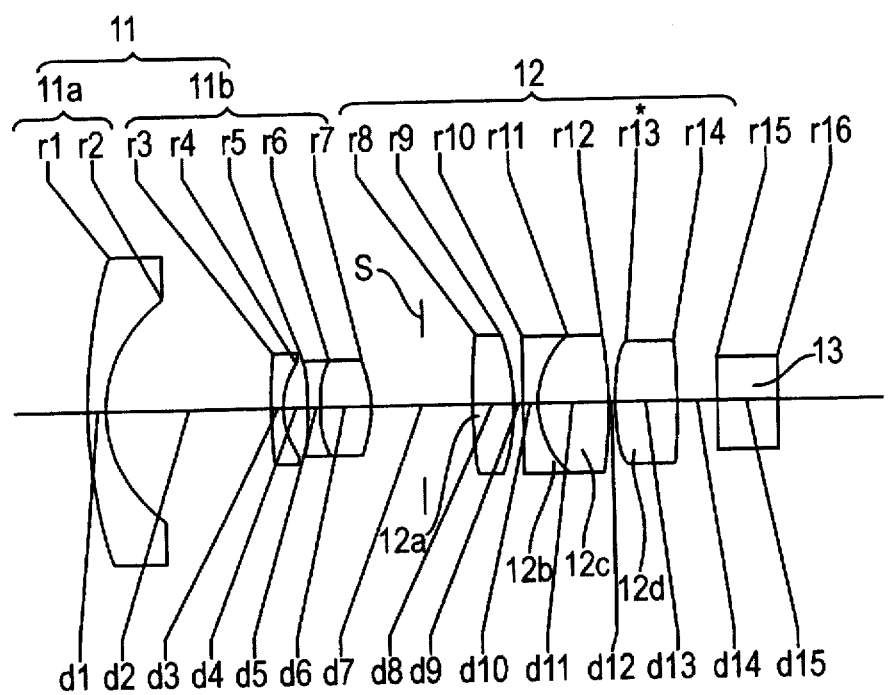
FIG. 5 is a schematic view of a lens arrangement of a super wide-angle fast lens system of a third embodiment.
Figure 6A:
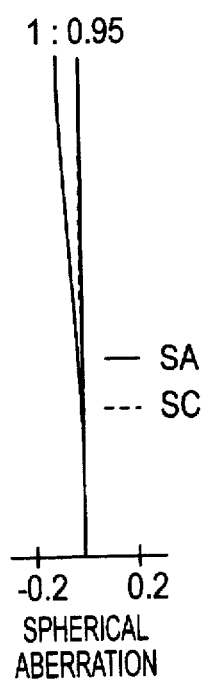
FIGS. 6A, 6B, 6C and 6D show aberration diagrams of the super wide-angle fast lens system shown in FIG. 5.
Figure 6B:
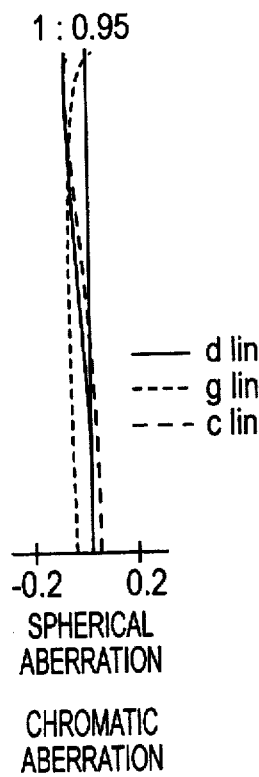
Figure 6C:
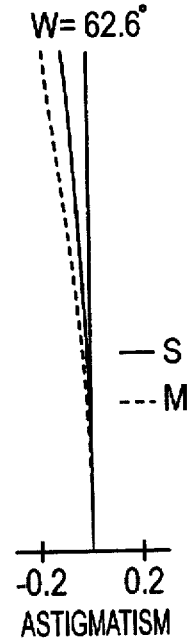
Figure 6D:
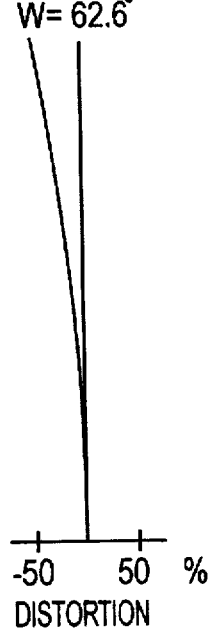

A super wide-angle fast lens system according to the present invention consists of a negative lens group (front lens group 11), a diaphragms and a positive lens group (rear lens group 12), arranged in this order from the object side or the lens, i.e., the left hand side in FIGS. 1, 3 and 5. In a wide-angle lens system consisting of a negative lens group and a positive lens group, if the focal length is shortened in accordance with the change of the picture size of an image pickup device of a small TV camera from ½" to ⅓", it is necessary to increase the negative power of the front lens group 11 (negative lens group) in order to have the same back focal distance ($f_B$) as that for the picture size of ½". Moreover, it is necessary to consider the power distribution of the front lens group 11 in connection with the power of the whole optical system.

Relationship (1) ($-0.5 < f/f_F < -0.2$) specifies the negative power of the front lens group 11. If the value of the ratio defined in relationship (1) is above the upper limit, the back focal distance is too small for mounting to a small TV camera. If the value of the ratio defined in relationship (1) is below the lower limit, aberrations produced in the front lens group 11 are too large to correct.

Relationship (2) ($-0.2 < f/f_{1a} < -0.04$) specifies the power of the first sub-lens group of the first lens group 11. If the value of the ratio defined in relationship (2) is above the upper limit, no sufficient back focal distance can be obtained. If the value of the ratio defined in relationship (2) is smaller than the lower limit, the negative power of the first sub-lens group 11a is so large that the radius of curvature of the concave surface is small and the ratio between the lens diameter and the radius of curvature becomes large, which makes it difficult to produce such a first sub-lens group 11a.

Relationship (3) ($3 < d_{ab}/f < 7$) specifies the distance between the first sub-lens group 11a and the second sub-lens group 11b of the first lens group 11. By setting the distance between the first sub-lens group 11a and the second sub-lens group 11b large enough as specified in relationship (3), not only can the aberrations be effectively corrected, but also the back focal distance can be increased. If the value of the ratio defined in relationship (3) is above the upper limit, the diameter of the front lens group 11 is increased. If the value of the ratio defined in relationship (3) is below the lower limit, no sufficient back focal distance can be obtained.

Since the half angle view of the wide-angle lens system is approximately 60° (super wide-angle), the diameter of the first sub-lens group 11a which is located away from the diaphragm is considerably larger than the diameter of the second sub-lens group 11b. Consequently, if the value of the ratio defined in relationship (3) is below the lower limit, the distance between the diaphragm and the first sub-lens group 11a is so small that the first sub-lens group 11a interferes with the diaphragm driving mechanism. To prevent the occurrence of the interference, the distance must be larger than the lower limit specified in relationship (3).

The power of the first sub-lens group 11a of the front lens group 11 relative to the power of the front lens group 11 is preferably set to be $0.3 < f_F/f_{1a} < 0.5$. If the power of the first sub-lens group 11a is so small that the value of $f_F/f_{1a}$ is below the lower limit, no sufficient back focal distance can be obtained. Conversely, if the power of the first sub-lens group 11a is so large that the value is above the upper limit (i.e., if the power of the first sub-lens group 11a is more than one-half of the power of the front lens group 11), the ratio between the lens diameter and the radius of curvature becomes large, which makes it difficult to produce the lens.

Relationship (4) ($10 < \Sigma d_{F+S}/f < 15$) specifies the requirements of the sum of the thickness of the front lens group 11 and the distance between the front lens group 11 and the rear lens group 12, that is the distance between the surface of the front lens group 12 nearest the object side and the surface of the rear lens group 11 nearest the object side. If the value specified in relationship (4) exceeds the upper limit, the whole length of the lens system is increased and the diameter of the front lens group 11 is increased. If the value of the ratio is smaller than the lower limit specified in relationship (4), it is difficult to increase the back focal distance, or it is necessary to increase the negative power of the front lens group in order to increase the back focal distance, thus resulting in a difficulty in correcting the aberrations.

Relationship (5) ($3.0 < \Delta I_{ASP} < -0.5$) relates to the divergent aspherical surface provided to at least one of the surfaces of the lens elements in the rear lens group 12. The aspherical surface is formed by applying an aspherical surface on a paraxial spherical surface (spherical substrate or spherical base surface). The expression "divergent aspherical surface" refers to an aspherical surface which provides a divergence to the surface refracting power of the spherical base surface. If the value specified in relationship (5) is above the upper limit, the effect of the aspherical surface is attenuated and the spherical aberration and the comatic aberration (i.e., coma) cannot be effectively corrected. Conversely, if the value defined in relationship (5) is smaller than the lower limit, an over-correction of the aberrations, mentioned above, occurs.

Relationship (6) ($5.0 < \Sigma d_R/f < 10.0$) specifies the thickness of the rear lens group 12 to increase the aperture ratio (F-number). If the value defined in relationship (6) is above the upper limit, the whole lens length and the diameter of the rear lens group are 12 increased. Conversely, if the value specified in relationship (6) is below the lower limit, the thickness of the peripheral portion of the lens is too small to obtain a super wide-angle lens having a large aperture which is approximately identical to F0.8 to F0.95.

The variation of the third-order spherical aberration coefficient due to the aspherical surface will be discussed below.

An aspherical shape (surface) is defined by the following relationship, namely:

$$x = cy^2/[1+\{1-(1+K)c^2y^2\}^{1/2}] + A4y^4 + A6y^6 + A8y^8 + A10y^{10} + \quad (i)$$

wherein, y represents a height above the axis, x represents a distance from a tangent plane of an aspherical vertex, c represents a curvature of the aspherical vertex($1/r$), K represents a conic constant, A4 represents a fourth-order aspherical factor, A6 represents a sixth-order aspherical factor, A8 represents an eighth-order aspherical factor, and A10 represents a tenth-order aspherical factor.

In relationship (i), to obtain an aberration coefficient, the following replacements are made since $Bi=Ai$ when $K=0$:

$B4 = A4 + Kc^3/8$;

$B6 = A6 + (K^2+2K)c^5/16$;

$B8 = A8 + 5(K^3+3K^2+3K)c^7/128$;

$B10 = A10 + 7(K^4+4K^3+6K^2+4K)c^9/256$.

Thus, relationship (ii) can be obtained from relationship (i):

$$x = cy^2/[1+\{1-c^2y^2\}^{1/2}] + B4y^4 + B6y^6 + B8y^8 + B10y^{10} + \quad (ii)$$

Further, relationship (iii) can be obtained, in terms of the focal length $f=1.0$, when:

$X=x/f$, $Y=y/f$, $C=f \cdot c$, $\alpha 4 = f^3 B4$, $\alpha 6 = f^5 B6$, $\alpha 8 = f^7 B8$ and $\alpha 10 = f^9 B10$ Relationship (iii):

$$X = CY^2/[1+\{1-C^2Y^2\}^{1/2}] + \alpha 4 Y^4 + \alpha 6 Y^6 + \alpha 8 Y^8 + \alpha 10 Y^{10} + \quad (iii)$$

The second and subsequent terms of relationship (iii) (i.e., $\alpha 4 Y^4$ onwards) represent amounts of asphericity. The constant $\alpha 4$ has the following relationship with the third-order aspherical surface coefficient $\Phi$:

$$\Phi = 8(N'-N)\alpha 4$$

wherein N represents the refractive index of the side closer to the object than the aspherical surface, and N' represents the refractive index of the side closer to the image side than the aspherical surface.

Influence on a fourth aspherical factor to each aberration coefficient is given as follows:

$\Delta I = h^4 \Phi$;

$\Delta II = h^3 H \Phi$;

$\Delta III = h^2 H^2 \Phi$;

$\Delta IV = h^2 H^2 \Phi$;

$\Delta V = h H^3 \Phi$, wherein I represents a third-order spherical aberration factor, II represents a third-order comatic aberration factor, III represents a third-order astigmatism factor, IV represents a third-order curvature factor of the sagittal image surface, V represents a third-order distortion factor, h represents a height of the portion of the lens at which the paraxial on-axis rays pass through the lens, and H represents a height of the portion of the lens at which the paraxial off-axis rays pass through the center of the pupil.

Several examples (embodiments) of the present invention are discussed below.

FIGS. 1, 3 and 5 show lens arrangements of the first, second and third embodiments, respectively. In the first, second and third embodiments, the lens system consists of the front lens group 11, a diaphragm S and a rear lens group 12, in this order from the object side. The front lens group 11 consists of the two sub-lens groups which are spaced apart having a maximum distance ($d_2$) between the adjacent lenses among the lenses in the front lens group, i.e., first sub-lens group 11a and second sub-lens group 11b. The first sub-lens group 11a is made of a single meniscus lens (surface Nos. 1 and 2) whose convex surface faces the object side. The second sub-lens group 11b is made of three lens elements two of which are cemented together (surface Nos. 3 through 7). The rear lens group 12 consists of a positive convexo-convex (double convex) lens element 12a, a negative lens element 12b having a concave surface located on the image side, a positive convexo-convex (double convex) lens element 12c, and a positive convexo-convex (double convex) lens element 12d. The negative lens element 12b and the positive lens element 12c are cemented together. The curvature of the surface of the positive convexo-convex lens element 12a on the image side (surface No. 9) is greater than the curvature of the surface thereof on the object side (surface No. 8). The curvature of the cementing surface between the cemented negative lens element 12b and positive lens element 12c (surface No. 11) is greater than the curvature of the remaining surfaces (surface Nos. 10 and 12). The curvature of the surface of the positive convexo-convex lens element 12d that is located on the object side (surface No. 13) is greater than the curvature of the surface thereof on the image side (surface No. 14).

The surface Nos. 15 and 16 define a glass cover 13 of the CCD (not shown). Note that in practice, the glass cover 13 is integrally provided with a filter, but is referred to herein as a single glass cover.

The first, second and third embodiments will be described with reference to the following tables and the accompanying diagrams, in which "$F_{NO}$" represents the F-number, "f" represents the focal length, "ω" represents the half angle of view, "$f_B$" represents the back focal distance (distance between the surface of the last lens on the image side and the image pickup surface of the CCD including the glass cover 13; the image pickup surface is identical to the second (image-side) surface of the glass cover in the illustrated embodiments), "ri" represents the radius of curvature of each lens surface, "di" represents the lens thickness or distance between adjacent lenses, "N" represents the refractive index of the d-line, and "ν" represents the Abbe number of the d-line. In the aberration drawings (FIGS. 2A through 2D, 4A through 4D and 6A through 6D) "SA" represents the spherical aberration, "SC" represents the sine condition, "d-line", "g-line" and "C-line" represent the chromatic aberrations represented by spherical aberrations, at the respective wavelengths, "S" represents the sagittal rays, and "M" the meridional rays, respectively "W" represents the half angle of view.

The shape of the aspherical surface can be generally expressed as follows:

$$x = cy^2\{1+[1-(1+K)c^2y^2]^{1/2}\}+A4y^4+A6y^6+A8y^8+A10y^{10}+$$

wherein, y represents a height above the axis, x represents a distance from a tangent plane of an aspherical vertex, c represents a curvature of the aspherical vertex($1/r$), K represents a conic constant, A4 represents a fourth-order aspherical factor, A6 represents a sixth-order aspherical factor, A8 represents an eighth-order aspherical factor, and A10 represents a tenth-order aspherical factor.

FIRST EMBODIMENT

A lens arrangement of a fast super wide-angle lens system having a large aperture according to the first embodiment is shown in FIG. 1. Numerical data regarding the first embodiment is shown in Table 1 below. Aberrations in the lens system of the first embodiment are shown in FIGS. 2A, 2B, 2C and 2D.

TABLE 1

$F_{NO} = 1:0.8$
$f = 2.88$
$ω = 62.3$
$f_B = d_{14} + d_{16} = 9.40$

| surface No. | r | d | N | ν |
|---|---|---|---|---|
| 1 | 46.431 | 1.50 | 1.77250 | 49.6 |
| 2 | 12.480 | 13.92 | — | — |
| 3 | 49.884 | 1.22 | 1.83481 | 42.7 |
| 4 | 7.548 | 2.23 | — | — |
| 5 | −25.288 | 1.20 | 1.80023 | 29.2 |
| 6 | 7.403 | 4.65 | 1.84666 | 23.8 |
| 7 | −15.916 | 5.94 | — | — |
| diaphragm | ∞ | 4.87 | — | — |
| 8 | 55.036 | 3.84 | 1.74320 | 49.3 |
| 9 | −29.471 | 2.11 | — | — |
| 10 | −506.763 | 1.20 | 1.84666 | 23.8 |
| 11 | 8.976 | 7.00 | 1.76400 | 49.0 |
| 12 | −31.908 | 0.96 | — | — |
| 13* | 11.969 | 5.70 | 1.66625 | 55.2 |
| 14 | −46.478 | 3.70 | — | — |
| 15 | ∞ | 5.70 | 1.49782 | 66.8 |
| 16 | ∞ | — | — | — |

*designates aspherical surface

Aspherical Data for Surface No. 13

$K=0.0$, $A4=-0.38860\times10^{-4}$, $A6=-0.76296\times10^{-6}$, $A8=0.48918\times10^{-8}$, $A10=-0.94415\times10^{-11}$, $A12=0.0$

SECOND EMBODIMENT

A lens arrangement of a fast super wide-angle lens system according to the second embodiment is shown in FIG. 3. Numerical data regarding the second embodiment is shown in Table 2 below. Aberrations in the lens system of the second embodiment are shown in FIGS. 4A, 4B, 4C and 4D.

TABLE 2

$F_{NO} = 1:0.95$
$f = 2.88$
$ω = 62.4$
$f_B = d_{14} + d_{16} = 9.41$

| surface No. | r | d | N | ν |
|---|---|---|---|---|
| 1 | 50.120 | 1.50 | 1.77250 | 49.6 |
| 2 | 12.787 | 14.39 | — | — |
| 3 | 35.382 | 1.22 | 1.83481 | 42.7 |
| 4 | 7.839 | 2.73 | — | — |
| 5 | −24.006 | 1.20 | 1.80440 | 39.6 |
| 6 | 10.344 | 4.65 | 1.84666 | 23.8 |
| 7 | −17.118 | 5.97 | — | — |
| diaphragm | ∞ | 4.90 | — | — |
| 8* | 49.867 | 3.84 | 1.74320 | 49.3 |
| 9 | −26.962 | 1.05 | — | — |
| 10 | 629.935 | 1.20 | 1.84666 | 23.8 |
| 11 | 8.165 | 7.00 | 1.78800 | 47.4 |
| 12 | −24.988 | 1.55 | — | — |
| 13 | 13.656 | 4.24 | 1.66625 | 55.2 |

TABLE 2-continued $F_{NO} = 1:0.95$
$f = 2.88$
$\omega = 62.4$
$f_R = d_{14} + d_{15} = 9.41$

| surface No. | r | d | N | ν |
|---|---|---|---|---|
| 14 | −153.130 | 3.71 | — | — |
| 15 | ∞ | 5.70 | 1.49782 | 66.8 |
| 16 | ∞ | — | — | — |

*designates aspherical surface

Aspherical Data for Surface No. 8
K=0.0, A4=−0.39338×10$^{-4}$, A6=0.25604×10$^{-7}$, A8=0.95540×10$^{-9}$, A10=0.20021×10$^{-10}$, A12=0.0

THIRD EMBODIMENT

A lens arrangement of a fast super wide-angle lens system according to the third embodiment is shown in FIG. 5. Numerical data regarding the third embodiment is shown in Table 3 below. Aberrations in the lens system of the third embodiment are shown in FIGS. 6A, 6B, 6C and 6D.

TABLE 3

$F_{NO} = 1:0.95$
$f = 2.88$
$\omega = 62.6$
$f_R = d_{14} + d_{15} = 9.40$

| surface No. | r | d | N | ν |
|---|---|---|---|---|
| 1 | 52.182 | 1.50 | 1.77250 | 49.6 |
| 2 | 12.800 | 15.11 | — | — |
| 3 | 42.110 | 1.22 | 1.83481 | 42.7 |
| 4 | 7.500 | 2.02 | — | — |
| 5 | −25.702 | 1.20 | 1.80440 | 39.6 |
| 6 | 9.260 | 4.65 | 1.84666 | 23.8 |
| 7 | −16.160 | 5.24 | — | — |
| diaphragm | ∞ | 4.17 | — | — |
| 8 | 44.850 | 3.84 | 1.74320 | 49.3 |
| 9 | −31.408 | 0.77 | — | — |
| 10 | −2275.000 | 1.20 | 1.84666 | 23.8 |
| 11 | 8.233 | 7.00 | 1.78800 | 47.4 |
| 12 | −26.975 | 0.50 | — | — |
| 13* | 13.765 | 5.70 | 1.66625 | 55.2 |
| 14 | −51.786 | 3.70 | — | — |
| 15 | ∞ | 5.70 | 1.49782 | 66.8 |
| 16 | ∞ | — | — | — |

*designates aspherical surface

Aspherical Data for Surface No 13:
K=0.0, A4=−0.39130×10$^{-4}$, A6=−0.41090×10$^{-6}$, A8=0.41830×10$^{-8}$, A10=−0.35520×10$^{-10}$, A12=0.0

Numerical values of the relationships (1) through (6), and the relation $f_F/f_{1a}$, corresponding to the three embodiments are shown in Table 4 below.

TABLE 4

|  | Embodiment 1 | Embodiment 2 | Embodiment 3 |
|---|---|---|---|
| Relationship(1) | −0.28 | −0.28 | −0.29 |
| Relationship(2) | −0.13 | −0.13 | −0.13 |
| Relationship(3) | 4.83 | 4.99 | 5.24 |
| Relationship(4) | 12.3 | 12.7 | 12.2 |
| Relationship(5) | −0.89 | −1.37 | −0.91 |
| Relationship(6) | 7.22 | 6.61 | 6.59 |
| $f_F/f_{1a}$ | 0.46 | 0.45 | 0.44 |

As can be seen from Table 4 above, the first through third embodiments satisfy the requirements specified in relationships (1) through (6). Moreover, the power of the first sub-lens group is less than one-half of the power of the front lens group (see $f_F/f_{1a}$) in each embodiment. It can be also seen from FIGS. 2A–2D, 4A–4D, and 6A–6D that the aberrations are appropriately corrected.

As can be understood from the above discussion, according to the present invention, a highly effective fast super wide-angle lens system having a large aperture approximately equal to F0.8 to F0.95, and a half angle of view which is approximately identical to 60°, for a small TV camera, can be provided.

What is claimed is:

1. A fast super wide-angle lens system, comprising:

a front lens group having a negative power;

a diaphragm; and a rear lens group having a positive power, wherein said front lens group, said diaphragm and said rear lens group are arranged in this order from an object side, said front lens group comprising a first sub-lens group having a negative power and a second sub-lens group having a negative power which is spaced from said first sub-lens group by a maximum distance among the lenses in the front lens group;

and further wherein said lens system satisfies the following relationships:

$-0.5 < f/f_F < -0.2$, $-0.2 < f/f_{1a} < -0.07$, $3 < d_{ab}/f < 7$, $10 < \Sigma d_{F+S}/f < 15$, and wherein f represents a focal length of the whole lens system, $f_F$ represents a focal length of said front lens group, $f_{1a}$ represents a focal length of said first sub-lens group of said first lens group, $d_{ab}$ represents a distance between said first sub-lens group and said second sub-lens group of said first lens group, and $\Sigma d_{F+S}$ represents a sum of a thickness of said front lens group and a distance between said front and rear lens groups.

2. The fast super wide-angle lens system according to claim 1, wherein said rear lens group comprises a positive lens element having a convex surface on an image side, a cemented lens of a negative lens element and a positive lens element which is cemented to said negative lens at a concave surface that faces said image side, and a positive lens element having a convex surface located on said object side, at least one of said lens elements of said rear lens group being provided with a divergent aspherical surface, wherein said lens system satisfies the following relationships:

$-3.0 < \Delta I_{ASP} < -0.5$, and $5.0 < \Sigma d_R/f < 10.0$, wherein $\Delta I_{ASP}$ represents an aberration factor of an aspherical term of a third-order spherical aberration factor of said aspherical surface when said focal length f is 1.0, and $\Sigma d_R$ represents a thickness of said rear lens group.

* * * * *